J. LORENC.
VEHICLE FENDER.
APPLICATION FILED AUG. 30, 1917.
1,255,189.
Patented Feb. 5, 1918.
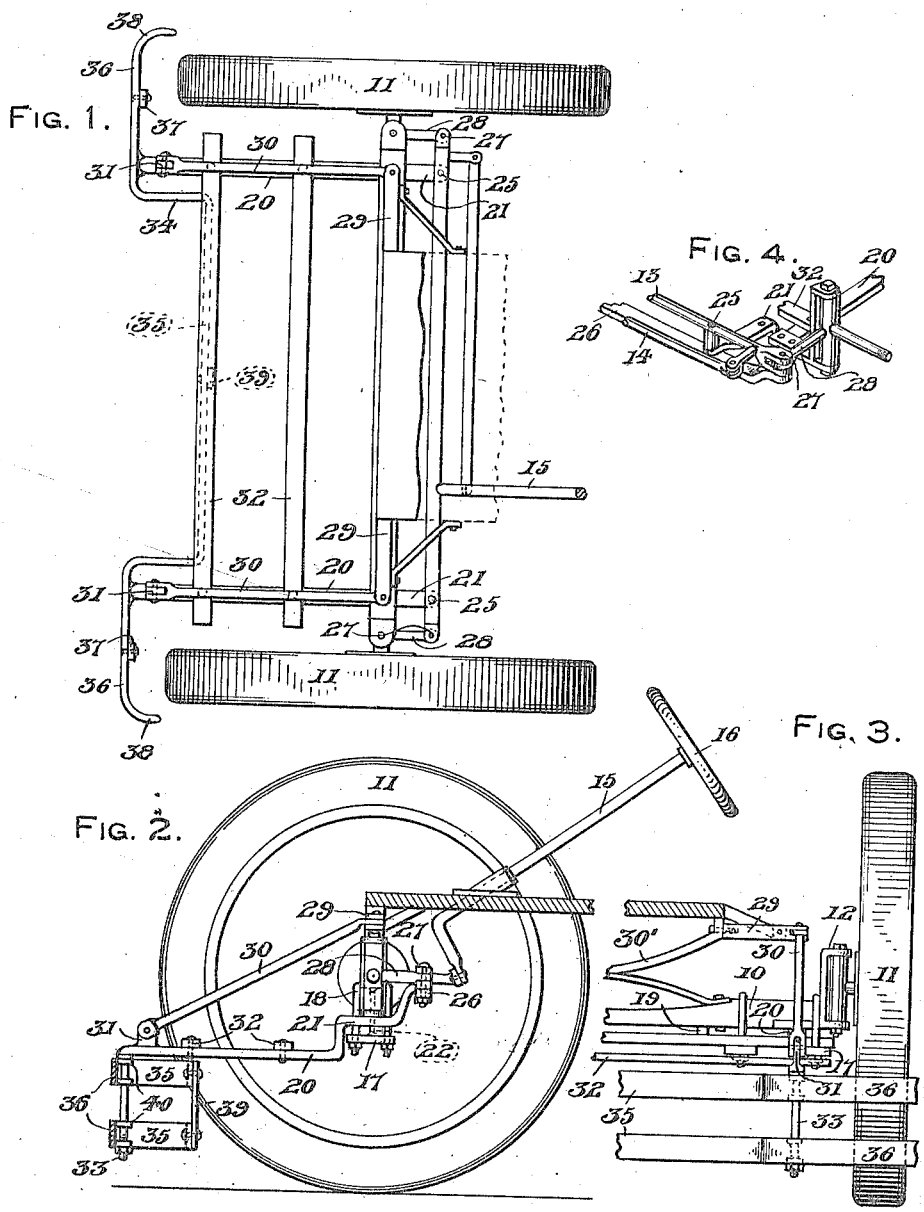
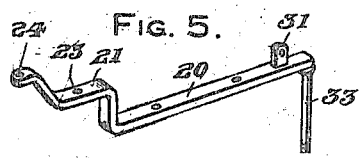
Inventor
J. Lorenc
By A. W. Wilson
Attorney

UNITED STATES PATENT OFFICE.

JAN LORENC, OF PHILADELPHIA, PENNSYLVANIA.

VEHICLE-FENDER.

1,255,189.  Specification of Letters Patent.  Patented Feb. 5, 1918.

Application filed August 30, 1917. Serial No. 188,952.

*To all whom it may concern:*

Be it known that I, JAN LORENC, a citizen of Russia, residing at Philadelphia, in the county of Philadelphia and State of Pennsylvania, have invented certain new and useful Improvements in Vehicle-Fenders, of which the following is a specification.

This invention relates to certain new and useful improvements in vehicle fenders.

The primary object of the invention is the provision of a fender for vehicles, which fender is associated with the steering gear of the vehicle in such a manner as to constantly position a guard portion of the device forwardly of the vehicle wheels and preventing persons from being run over by the said wheels.

A further object of the invention is the provision of a device that is easily and cheaply manufactured and is of light weight adapted for positioning upon the axle of a vehicle, the arrangement being such that the device is automatically shifted during the steering of the vehicle so as to accurately arrange the device at all times in such a position as to best guard the vehicle wheels.

A still further object of the invention is the provision of a dirigible fender adapted for direct attachment to a vehicle and operatively associated with the steering gear thereof for automatic shifting during the steering operation whereby the fender will maintain its normal position relatively of the wheels.

In the drawing forming a part of this application and in which like designating characters refer to corresponding parts throughout the several views.

Figure 1 is a top plan view of the forward portion of a chassis arranged with my device installed thereon.

Fig. 2 is a central longitudinal sectional view of the same.

Fig. 3 is a front elevation of one side portion thereof.

Fig. 4 is a detail perspective view of a portion of the steering mechanism with the device secured thereto and Fig. 5 is a perspective view of one of the frame members of the device.

Referring more in detail to the drawing it will be understood that the device may be attached to any form of vehicle but is especially serviceable in connection with an automobile and is herein illustrated as mounted upon the forward portion of an automobile having a front axle 10 provided with ground wheels 11 shiftably mounted on the opposite ends thereof by means of steering knuckles 12 and arranged with a connecting bar 13 to which the steering link 14 is pivoted, the latter being operatively attached to a steering post 15 adapted for turning by a steering wheel 16 in substantially the usual manner for performing the steering operation of the vehicle.

A maintaining girder 17 is secured horizontally beneath the axle 10 by means of clevis bolts or strips 18 encircling the axle 10 while transverse lugs 19 are arranged upon said girder contacting the lower face of the axle for spacing the girder and axle apart in parallel relations. Two frame members or arms 20 are arranged having angular rear end portions 21 freely positioned between the axle 10 and girder 17, pivotally connected therebetween by bolts 22 passing through perforations 23 in the frame portions 21.

The rear ends 24 of the arms 20 are pivoted as at 25 between the cross rod 13 of the steering mechanism and a brace bar 26 arranged parallel therebeneath pivotally attached at its opposite ends to the pivots 27 of the steering mechanism which connect the rod 13 with the arms 28 of the steering knuckles 12. Laterally projecting mounts 29 are attached to the forward springs 30 of the vehicle having their outer ends pivotally connected by means of links 30 with lugs 31 arranged upon the arms 20 adjacent their forward ends. A plurality of cross bars 32 are pivotally connected between the arms 20 in horizontal parallel arrangement whereby the bars 32 will be maintained parallel with each other and the arms 20 will always be parallel with each other during the lateral swinging movements imparted to the arms 20 by the shifting of the steering bar 13 and brace bar 26 simultaneously with the steering operation.

Parallel depending posts 33 are carried by the forward ends of the arm 20 having a buffer 34 pivoted therebetween. The said buffer consists of parallel arms 35 having lateral end portions 36 projecting in advance of the wheels 11, and connected together by vertical stays 37, the free ends of the arms 35 being rearwardly turned as at 38 adjacent the outer sides of the ground wheels. The arms 35 are centrally connected together by stays 39 while the pivotal connections between the buffer 36 and the post 33 are indicated at 40.

It will be understood that with the device operatively arranged upon the vehicle as herein illustrated, the movements of the steering mechanism operated by the hand wheel 16 shifts the arms 20 accordingly carrying the buffer 36 therewith by reason of its pivotal attachment with the post 33 laterally shifts in either direction, constantly maintaining the buffer in the same relative position forwardly of the wheels 11 and with the main portion of the buffer in parallelism with the bars 32 of the fender as well as with the axle 10 of the automobile and the connecting rod 13 of the steering gear thereof. A light and serviceable fender is arranged for vehicles insuring a protection at all times to the forward wheels of the vehicle during the usual forward movement thereof as well as its lateral movements when being steered from side to side in either direction desired. My device may be manufactured with the vehicle or supplied for ready attachment thereto when found desirable and while the preferable embodiment of the invention is herein illustrated, it will be understood that modifications may be made therein for accommodating the same to other forms of steering gears without departing from the spirit and scope of the invention as hereinafter claimed.

What I claim as new is:—

1. In combination with a vehicle having a front axle arranged with ground wheels mounted thereon and a steering connecting bar for the said wheels, a brace bar pivotally mounted parallel with said connecting bar, a girder arranged parallel with the said axle, parallel arms pivoted between the said girder and axle with the rear free ends of the arms pivoted between the said bars, and a buffer pivotally suspended from the forward ends of the arms extending to points forwardly of the wheels in constant parallelism with the said axle and bars.

2. In combination with a vehicle having a front axle arranged with ground wheels mounted thereon and a steering connecting bar for the said wheels, a brace bar pivotally mounted parallel with said connecting bar, a girder arranged parallel with the said axle, parallel arms pivoted between the said girder and axle with the rear free ends of the arms pivoted between the said bars, laterally projecting mounts carried by the vehicle, links pivotally connecting the said mounts and arms, bars arranged in constant parallelism pivotally connected between the said arms and a depending buffer pivotally carried by the forward free ends of the arms having opposite end portions constantly arranged uniformly positioned forwardly of the vehicle wheels.

3. In combination with a vehicle having a front axle arranged with ground wheels mounted thereon and a steering connecting bar for the said wheels, a brace bar pivotally mounted parallel with said connecting bar, a girder arranged parallel with the said axle, parallel arms pivoted between the said girder and axle with the rear free ends of the arms pivoted between the said bars, transverse spacing lugs between the said girder and axle, depending posts upon the forward ends of said arms, a buffer comprising spaced bars pivotally mounted upon the said post and having their opposite free ends constantly positioned forwardly of the vehicle wheels and terminating in rearwardly grooved portions adjacent the outer sides of the wheels.

4. In combination with a vehicle having a front axle arranged with ground wheels mounted thereon and a steering connecting bar for the said wheels, a brace bar pivotally mounted parallel with said connecting bar, a girder arranged parallel with the said axle, parallel arms pivoted between the said girder and axle with the rear free ends of the arms pivoted between the said bars, laterally projecting mounts carried by the vehicle, links pivotally connecting the said mounts and arms, slats arranged in constant parallelism pivotally connected between the said arms, transverse spacing lugs between the said girders and axle, depending posts upon the forward ends of said arms, a buffer comprising spaced wires pivotally mounted upon the said post and having their opposite free ends constantly position forwardly of the vehicle wheels and terminating in rearwardly grooved portions adjacent the outer sides of the wheels.

In testimony whereof I affix my signature.

JAN LORENC.